(12) United States Patent
Huang

(10) Patent No.: US 7,408,277 B2
(45) Date of Patent: Aug. 5, 2008

(54) STEP-BY-STEP MOTOR ABLE TO CARRY OUT UP-AND-DOWN MOTION

(76) Inventor: Hsian-Yi Huang, P.O. Box 90, Tainan City (TW) 70499

( * ) Notice: Subject to any disclaimer, the term of this patent is extended or adjusted under 35 U.S.C. 154(b) by 20 days.

(21) Appl. No.: 11/583,866

(22) Filed: Oct. 20, 2006

(65) Prior Publication Data

US 2008/0093942 A1    Apr. 24, 2008

(51) Int. Cl.
*H02K 37/12* (2006.01)

(52) U.S. Cl. .................................... 310/49 R
(58) Field of Classification Search ................. 362/524; 310/12, 15, 49 R
See application file for complete search history.

(56) References Cited

U.S. PATENT DOCUMENTS

| 3,614,487 A * | 10/1971 | Hatschek | 310/329 |
| 3,742,208 A * | 6/1973 | Mills | 362/216 |
| 4,501,981 A * | 2/1985 | Hansen | 310/49 R |
| 6,543,924 B2 * | 4/2003 | Sugimoto et al. | 362/523 |
| 6,609,995 B1 * | 8/2003 | Kurz | 482/121 |

* cited by examiner

*Primary Examiner*—Tran Nguyen

(57) ABSTRACT

A step-by-step motor able to carry out up-and-down motion includes a housing, a bearing, a connecting member, a magnet, a rod unit, a right-handed coil, a reverse coil and a bayonet socket combined together. After the electric wires of the bayonet are electrically connected, the right-handed coil and the reverse coil respectively connected with the electric wires will be electrified to actuate the magnet and the connecting member to rotate clockwise or counter-clockwise. Simultaneously, the rod unit will be driven by the connecting member to move up or down linearly, able to carry out transmission effectively, small in size and taking less space.

1 Claim, 6 Drawing Sheets

STEP-BY-STEP MOTOR ABLE TO CARRY OUT UP-AND-DOWN MOTION

BACKGROUND OF THE INVENTION

1. Field of the Invention

This invention relates to a step-by-step motor able to carry out up-and-down motion, and particularly to one provided with a bayonet socket having electric wires respectively connected with a right-handed coil and a reverse coil. After the electric wires are electrically connected, the right-handed coil or the reverse coil will be electrified to actuate a magnet and a connecting member to rotate clockwise or counterclockwise. The present invention drives drive a top rod to move up or down linearly, and is able to carry out transmission steadily and effectively, small in size and occupies less space.

2. Description of the Prior Art

Generally, the headlamp of an automobile is installed with a step-by-step motor for adjusting the radiating height of the headlamp. A conventional step-by-step motor, as shown in FIGS. 1 and 2, includes a threaded rod 11 threadably combined with the threaded hole 121 of a shaft bushing 12. The shaft bushing 12 has one end extending outward and forming a polygonal bulging block 122 to be engaged with the engage hole 131 of a gear disk 13. An adjusting rod 14 intersecting at right angles with the threaded rod 11 has its lower end engaged with a gear 15 that is engaged with the gear disk 13. Then, all the members mentioned above are disposed in the interior of a fixing base 16 and a positioning base 17, and the adjusting rod 14 and the threaded rod 11 have their outer ends respectively extending out of the fixing base 16 and the positioning base 17. When the adjusting rod 14 is turned around, the threaded rod 11 will be driven to shift by interaction of the gear 15, the gear disk 13 and the shaft bushing 12. However, the conventional step-by-step motor has to be additionally provided with a transmission device at the exterior of the adjusting rod 14 for driving the adjusting rod 14 to rotate, thus enlarging the whole dimensions, taking too much space and failing to control operation precisely.

SUMMARY OF THE INVENTION

The objective of the invention is to offer a step-by-step motor able to carry out up-and-down motion, provided with a top rod able to be driven to move up and down linearly and taking less space.

The step-by-step motor able to carry out up-and-down motion in the present invention includes a housing having its interior formed with an accommodating chamber provided inside with a recessed chamber bored with a square hole and a round hole just on the square hole in the interior. A stopper is positioned between the square hole and the round hole. The accommodating chamber of the housing has one side bored with a recess, and the housing has its bottom fixedly mounted with a bottom cover. A bearing is received in the recessed chamber of the housing, and a connecting member is fixed under the bearing. The connecting member has its upper end inserted through the bearing, its outer circumferential wall secured thereon with a plurality of lengthwise projections and its central portion bored with a threaded hole. A magnet fitted around the connecting member is bored in the center with an insert hole having its inner wall disposed with a plurality of positioning engage grooves. A rod unit is inserted through the square hole and the round hole of the housing and threadably combined with the threaded hole of the connecting member. The rod unit consists of an upper holder and a rod, and the upper holder is provided with female threads, and the rod is provided with an upper male threaded portion, a square stopper in an intermediate portion and a lower male threaded portion. A right-handed coil and a reverse coil respectively bored with an insert hole in the center are overlapped and received in the accommodating chamber of the housing, respectively having the outer end wound on the connecting terminals of electric wires. The connecting terminals of the electric wires are respectively inserted in the plugholes of a bayonet socket.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
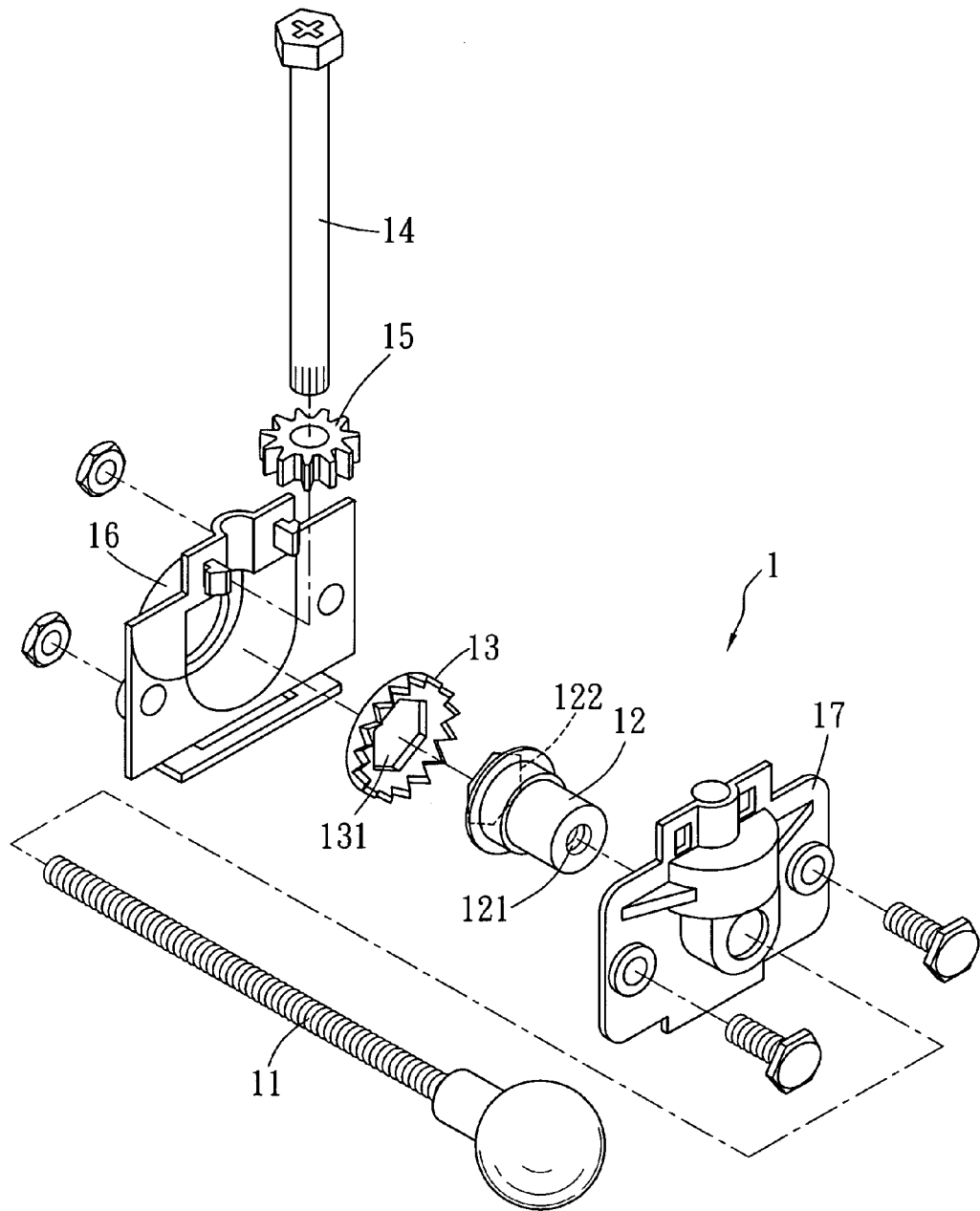
FIG. 1 is an exploded perspective view of a conventional step-by-step motor.
Figure 2:
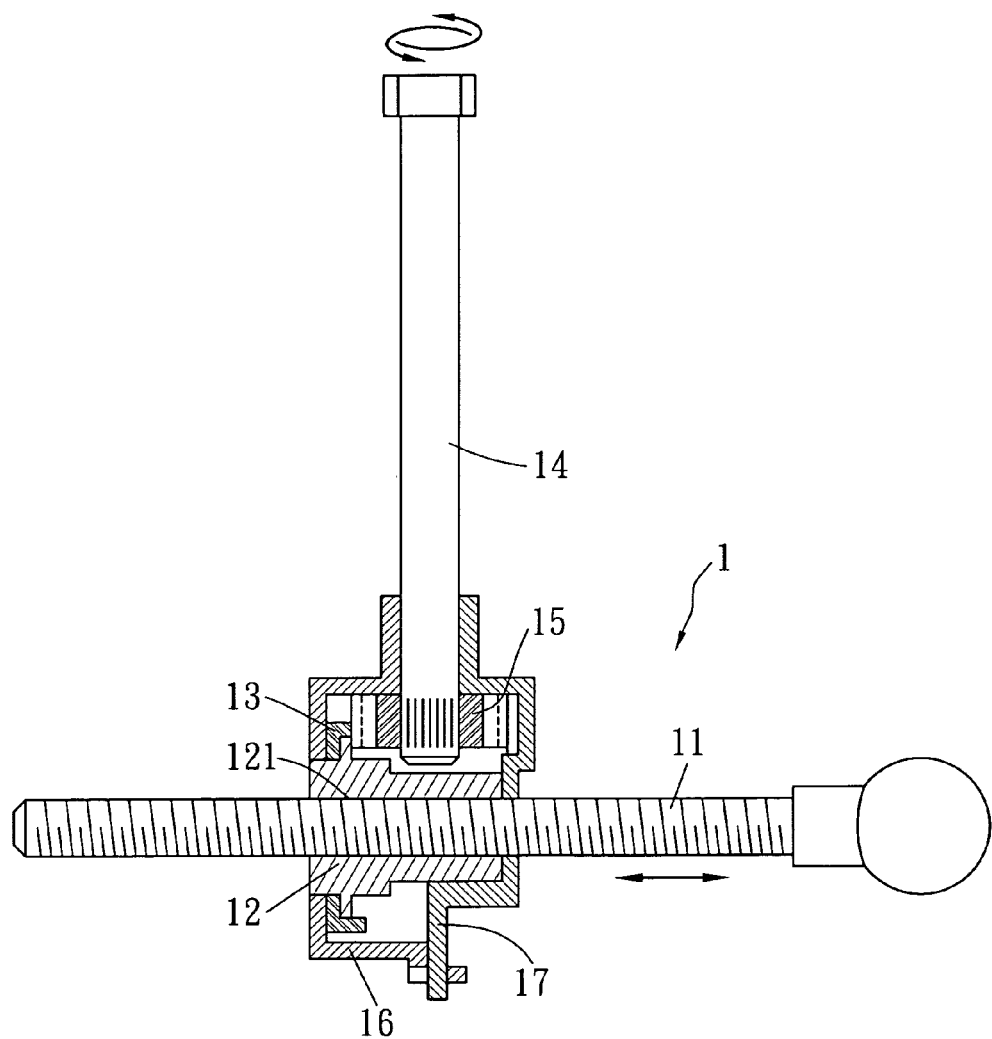
FIG. 2 is a cross-sectional view of the conventional step-by-step motor.
Figure 3:
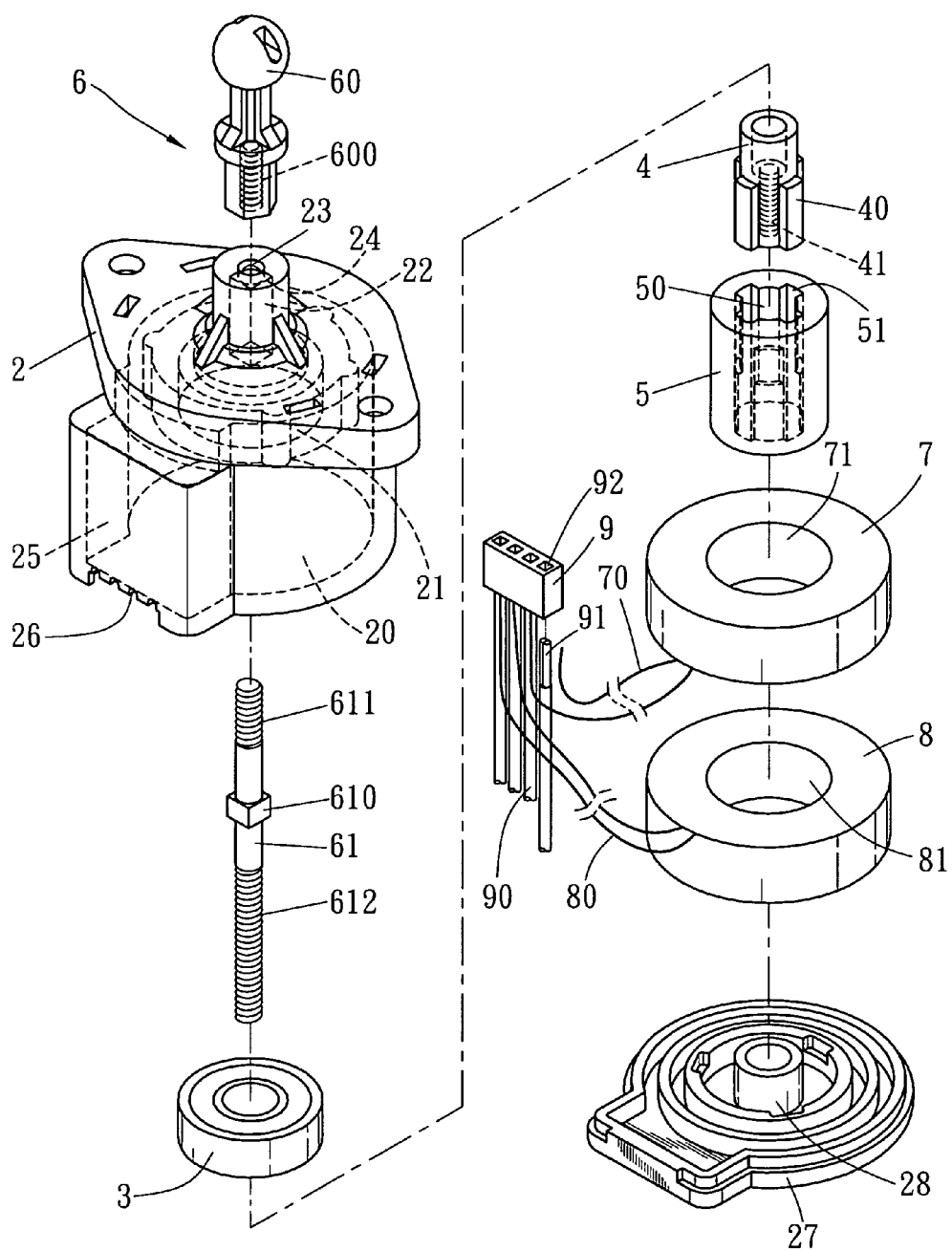
FIG. 3 is an exploded perspective view of a step-by-step motor able to carry out up-and-down motion in the present invention.
Figure 5:
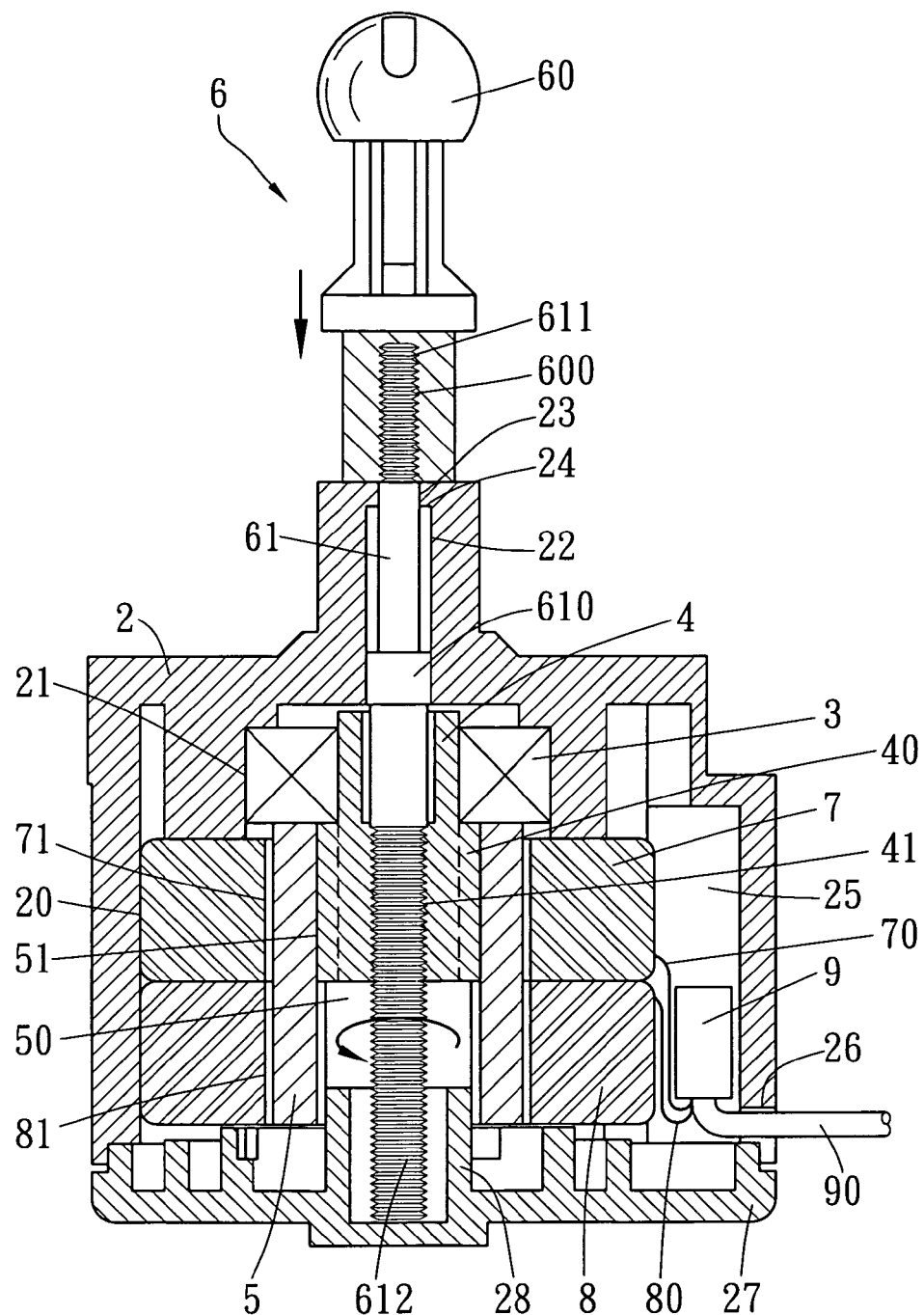
FIG. 5 is a cross-sectional view of the step-by-step motor having its rod unit driven to move downward in the present invention.

A preferred embodiment of a step-by-step motor able to carry out up-and-down motion in the present invention, as shown in FIGS. 3 and 5, includes a housing 2, a bearing 3, a connecting member 4, a magnet 5, a rod unit 6, a right-handed coil 7, a reverse coil 8 and a bayonet socket 9 as main components combined together.

The housing 2 has its interior formed with an accommodating chamber 20 provided inside with a recessed chamber 21 bored in the interior with a square hole 22, a small round hole 23 formed on the square hole 22 and communicating with the square hole 22 and a stopper 24 placed between the square hole 22 and the small round hole 23. The accommodating chamber 20 of the housing 2 has one side formed with a recess 25 having its bottom edge bored with a plurality of positioning engage grooves 26. Further, the housing 2 has its bottom fixed with a bottom cover 27 having a positioning post 28 disposed in the center.

The bearing 3 is received in the recessed chamber 21 of the housing 2.

The connecting member 4 is fixed under the bearing 3, having its upper end inserted through the bearing 3 and an outer circumferential wall of the connecting member 4 is secured thereon with a plurality of lengthwise projections 40 spaced apart equidistantly; and a center of the connecting member 4 is bored with a threaded hole 41.

The magnet 5 is fitted around the connecting member 4 and has its center bored with an insert hole 50; and an inner circumferential wall of the insert hole 50 is cut with a plurality of positioning engage grooves 51.

The rod unit 6 is inserted through the small round hole 23 and the square hole 22 of the housing 2 and threadably combined with the threaded hole 41 of the connecting member 4. The rod unit 6 consists of an upper holder 60 and a rod 61, and the upper holder is provided with female trades in a lower portion, and the rod 61 is provided with a square stopper 610 in an intermediate portion, an upper male threaded portion 611 in an upper portion, and a lower threaded portion 62 in a lower portion.

The right-handed coil 7 and the reverse coil 8 respectively bored with an insert hole 71, 81 in the center are overlapped and received in the accommodating chamber 20 of the housing 2. The right-handed coil 7 and the reverse coil 8 have their outer ends 70, 80 respectively connected to the connecting terminals 91 of electric wires 90, and then the connecting terminals 91 of the electric wires 90 are respectively inserted in the plug holes 92 of a bayonet socket 9.

Figure 4:
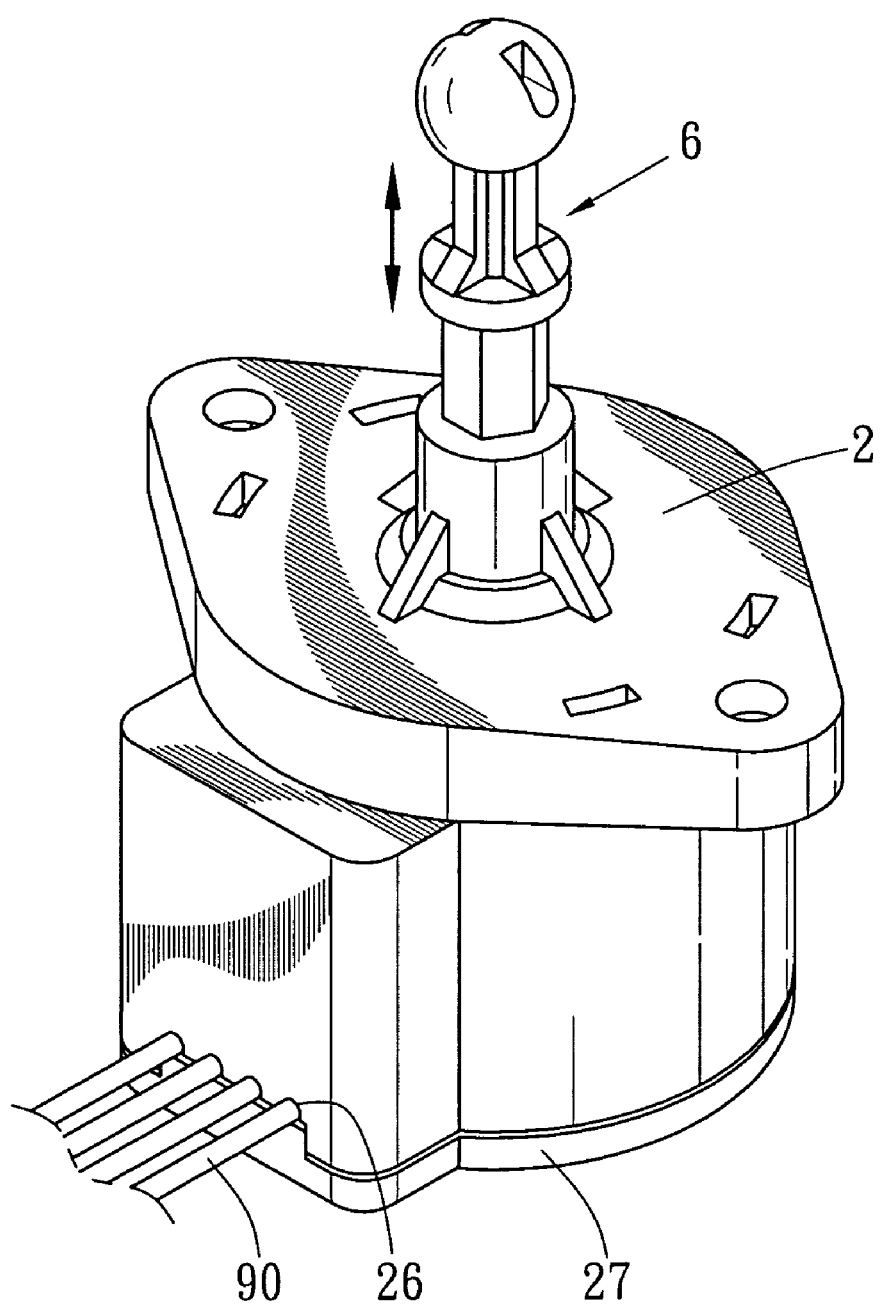
FIG. 4 is a perspective view of the step-by-step motor able to carry out up-and-down motion in the present invention.

In assembling, as shown in FIGS. 3, 4 and 5, firstly, the connecting member 4 has its upper end forcedly fitted in the bearing 3 to combine the connecting member 4 and the bearing 3 together. Then the magnet 5 is fitted around the connecting member 4 to have the projections 40 of the connecting member 4 respectively inserted in the positioning engage grooves 51 of the insert hole 50 of the magnet 5 to combine the connecting member 4 together with the magnet 5. Next, the above-mentioned members assembled together are received in the accommodating chamber 20 of the housing 2, letting the bearing 3 forcedly positioned in the recessed chamber 21 of the housing 2. Then, the rod unit 6 is inserted through the square hole 22 of the housing 2 from below and, with the square stopper 610 located in the square hole 22, with the upper male threaded portion 611 passing through the round hole 23 and further engaging with the female threads 600 of the upper holder 60. So the rode 61 is threadably combined with the upper holder 60, and the lower threaded portion 612 is engaged with the threaded hole of the connecting member 4. Then the square stopper 610 of the rod 61 is stopped by the stoppers 24 of the housing to prevent the rod unit 6 from slipping off the housing 2. Subsequently, the right-handed coil 7 and the reverse coil 8 are overlapped and pushed in the accommodating chamber 20 of the housing 2, letting the right-handed coil 7 and the reverse coil 8 fitted around the magnet 5. Afterward, the bayonet socket 9 connected with both the electric wires 90 and the outer ends 70, 80 of the right-handed and the reverse coil 7, 8 is positioned in the recess 25 at one side of the accommodating chamber 20 of the housing 2, letting the electric wires 90 respectively inserted through and positioned in the positioning engage grooves 26 at the bottom edge of the housing 2. Lastly, the bottom cover 27 is mounted at the bottom of the housing 2, letting the positioning post 28 of the bottom cover 27 inserted and positioned in the insert hole 50 of the magnet 5 and thus finishing assembly of the step-by-step motor.

Figure 6:
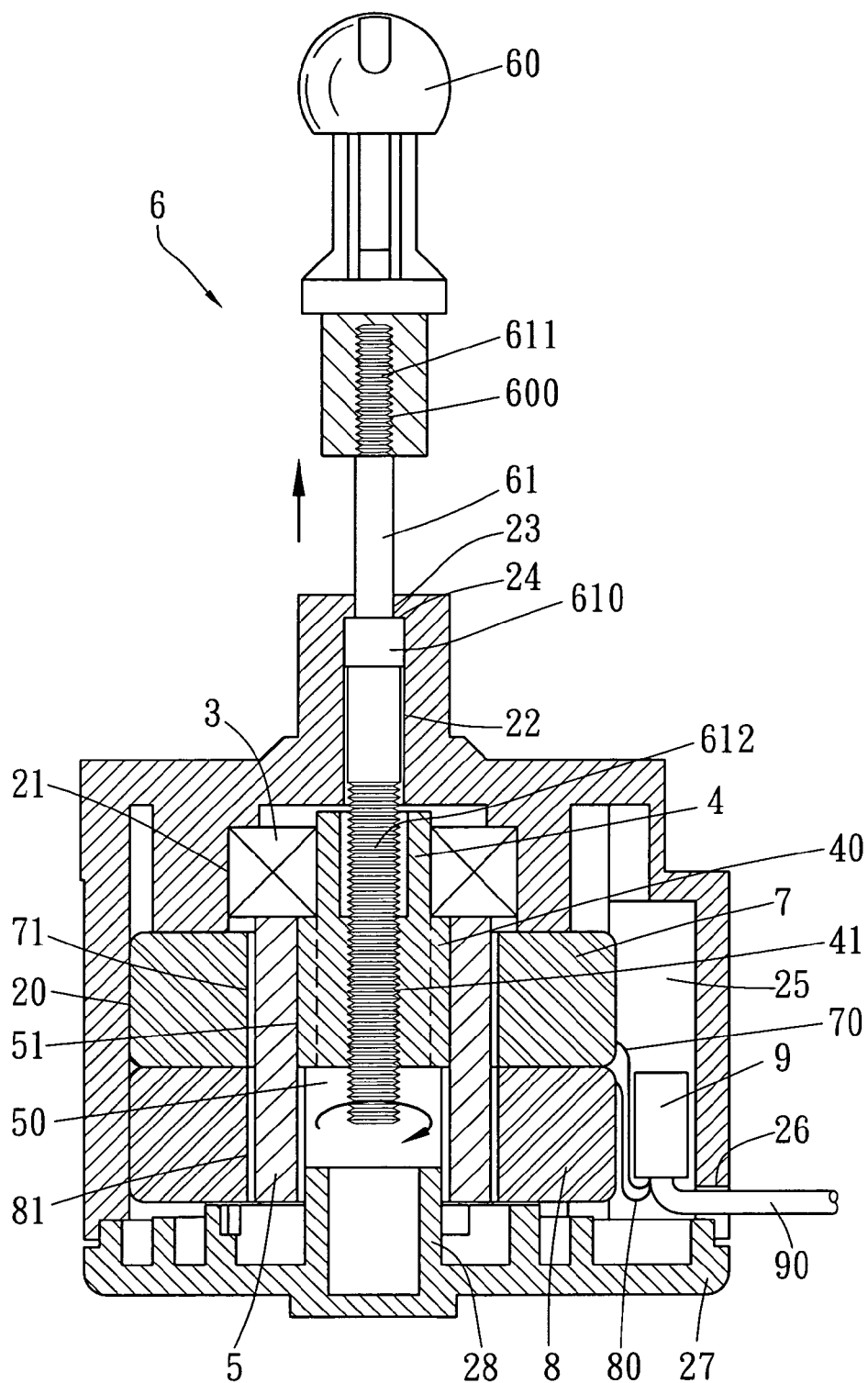
FIG. 6 is a cross-sectional view of the step-by-step motor having its top rod driven to move upward in the present invention.

In using, as shown in FIGS. 5 and 6, to drive the rod unit 6 to move upward, as shown in FIG. 6, after the electric wire 90 connected with the right-handed coil 7 is electrically connected through control of an external electric circuit, the right-handed coil 7 will be electrified to actuate the magnet 5 and the connecting member 4 to rotate clockwise. At this time, the rod unit 6 having the lower threaded portion 612 threadably combined with the threaded hole 41 of the connecting member 4 is restricted by the square groove 23 of the housing 2 not to rotate together with the connecting member 4 but only to be actuated to move upward linearly by means of the relative action of the lower threaded portion 612 of the rod unit 6 and the threaded hole 41 of the connecting member 4. On the contrary, to drive the rod unit 6 to move downward, as shown in FIG. 5, after the electric wire 90 connected with the reverse coil 8 is controlled by external electric circuit to make electric connection, the reverse coil 8 will be electrified to actuate the magnet 5 and the connecting member 4 to rotate counterclockwise, and simultaneously the rod unit 6 thread- ably combined with the connecting member 4 will be actuated to rotate counterclockwise and move downward linearly.

As can be understood from the above description, this invention has the following advantages.

1. The rod unit of the step-by-step motor can be driven to move up and down linearly, able to be operated steadily and carry out transmission effectively.

2. The step-by-step motor of this invention is small in size and takes less space.

While the preferred embodiment of the invention has been described above, it will be recognized and understood that various modifications may be made therein and the appended claims are intended to cover all such modifications that may fall within the spirit and scope of the invention

What is claimed is:

1. A step-by-step motor for carrying out up-and-down motion comprising:
   a housing (2),
   a bearing (3),
   a connecting member (4),
   a magnet (5),
   a rod unit (6),
   a right-handed coil (7),
   a reverse coil (8), and a bayonet socket (9), wherein:
   the housing (2) has an interior formed with an accommodating chamber (20); a recessed chamber (21) at an upper side of the accommodating chamber (20) and a recess (25) at one side of the accommodating chamber (20); a diameter of the recessed chamber (21) is smaller than that of the accommodating chamber (20); and the recess (25) has a rectangular cross section; an interior of the recessed chamber (21) has a square hole (22) and a small round hole (23) formed above the square hole (22) and communicating with the square hole (22); and a stopper (24) placed between the square hole (22) and the small round hole (23); a bottom of the recess (25) having a plurality of positioning engage grooves (26); the housing (2) is fixed With a bottom cover (27) at a bottom end thereof and the bottom cover has a positioning post (28) disposed in the center;
   the bearing (3) is received in the recessed chamber (21) of the housing (2);
   the connecting member (4), is fixed under the bearing (3), and has an upper end inserted through the bearing (3), and an outer circumferential wall of the connecting member (4) are secured a plurality of axial rectangular projections (40) spaced apart equidistantly and a center of the connecting member is bored with a threaded hole (41);
   the magnet (5) is fitted around the connecting member (4) and has a center of the magnets bored with an insert hole (50); and an inner circumferential wall of the inserted, hole (50) is formed with a plurality of positioning engage grooves (51) for receiving the axial rectangular projections (40);
   the rod unit (6) is inserted through the small round hole (23) and the square hole (22) of the housing (2) and threadably combined with the threaded hole (41) of the connecting member (4); the rod unit (6) consists of an upper holder (60) and a rod (61), wherein the upper holder is provided with female trades in a lower portion, and the rod (61) is provided with a square stopper (610) in an intermediate portion, an upper male threaded portion (611) in an upper portion, and a lower threaded portion (62 in a lower portion;
   the right-handed coil (7) and the reverse coil (8) respectively bored with an insert hole (71, 81) in the center are overlapped and received in the accommodating chamber (20) of the housing (2); the right-handed coil (7) and the reverse coil (8) have their outer ends (70, 80) respectively connected to the connecting terminals (91) of electric wires (190), and the connecting terminals (91) of the electric wires (90) are respectively inserted in the plug holes (92) of a bayonet socket (9); and, wherein an assembling unit including:

an upper end of the connecting member (4) being forced fitted in the bearing (3) to combine the connecting member (4) and the bearing (3) together; the magnet (5) is fitted around the connecting member (4) to have the projections (40) of the connecting member (4) respectively inserted in the positioning engage grooves (51) of the insert hole (50) of the magnet (5) to combine the connecting member (4) together with the magnet (5);

subsequently the assembling unit are received in the accommodating chamber (20) of the housing (2); the bearing (3) being forcedly positioned in the recessed chamber (21) of the housing (2); the rod unit (6) is inserted through the square hole (22) of the housing (2) from below and, with the square stopper (610) located in the square hole (22), with the upper male threaded portion (611) passing through the round hole (23) and further engaging with the female threads (600) of the upper holder (60) so that the rode (61) is threadably combined with the upper holder (60), and the lower threaded portion (612) is engaged with the threaded hole of the connecting member (4);

succeedingly, the square stopper (610) of the rod (61) is stopped by the stoppers (24) of the housing to prevent the rod unit (6) from slipping off the housing (2); subsequently, the right-handed coil (7) and the reverse coil (8) are overlapped and pushed in the accommodating chamber (20) of the housing (2), causing the right-handed coil (7) and the reverse coil (8) being fitted around the magnet (5);

subsequently, the bayonet socket (9) connected with both the electric wires 90 and tile outer ends (70, 80) of the right-handed and the reverse coil (7, 8) are positioned in the recess (25) at one side of the accommodating chamber (20) of the housing (2), letting the electric wires (90) respectively inserted through and positioned in the positioning engage grooves (26) at the bottom edge of the housing (2); and, the bottom cover (27) is mounted at the bottom of the housing (2), letting the positioning post (28) of the bottom cover (27) inserted and positioned in the insert hole (50) of the magnet (5).

* * * * *